No. 713,207. Patented Nov. 11, 1902.
J. H. COTTEN.
STALK CUTTER.
(Application filed Apr. 7, 1902.)
(No Model.) 2 Sheets—Sheet 1.

Witnesses
J. P. Britt
Harry Ellis Chandler

Inventor
J. H. Cotten,
By Chandler & Chandler
Attorneys

THE NORRIS PETERS CO., PHOTO-LITHO., WASHINGTON, D. C.

No. 713,207. Patented Nov. 11, 1902.
J. H. COTTEN.
STALK CUTTER.
(Application filed Apr. 7, 1902.)
(No Model.) 2 Sheets—Sheet 2.

Witnesses
T. P. Britt
Harry Ellis Chandler

Inventor
J. H. Cotten,
Attorneys

UNITED STATES PATENT OFFICE.

JOAB H. COTTEN, OF BIBB, TEXAS.

STALK-CUTTER.

SPECIFICATION forming part of Letters Patent No. 713,207, dated November 11, 1902.

Application filed April 7, 1902. Serial No. 101,730. (No model.)

*To all whom it may concern:*

Be it known that I, JOAB H. COTTEN, a citizen of the United States, residing at Bibb, in the county of Comanche, State of Texas, have invented certain new and useful Improvements in Stalk-Cutters; and I do hereby declare the following to be a full, clear, and exact description of the invention, such as will enable others skilled in the art to which it appertains to make and use the same.

This invention relates to choppers in general, and more particularly to that class designed for chopping cotton or corn stalks, it being understood, however, that the machine or implement may be employed for chopping any other specific growth.

The object of the invention is to provide an implement of this nature that will be simple and efficient in its operation, durable in structure, and which will cut a swath of maximum width while permitting of easy manipulation.

Other objects and advantages of the invention will be understood from the following description.

Figure 1:
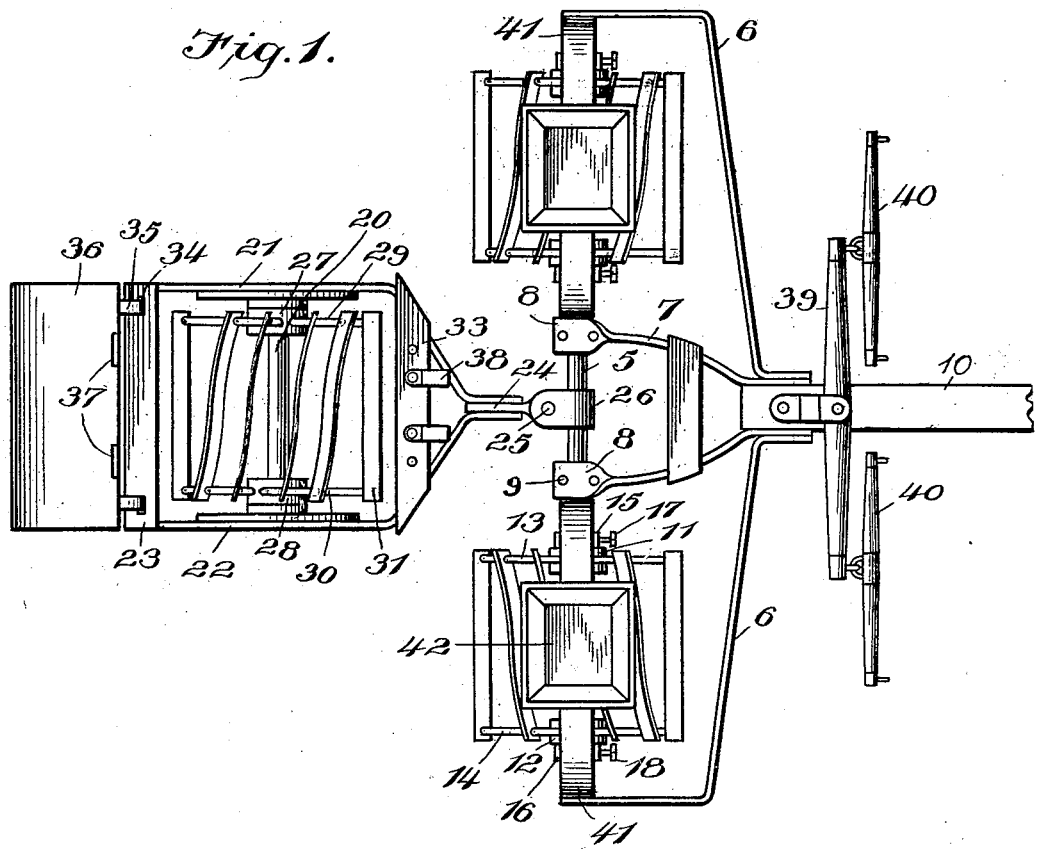
Figure 4:
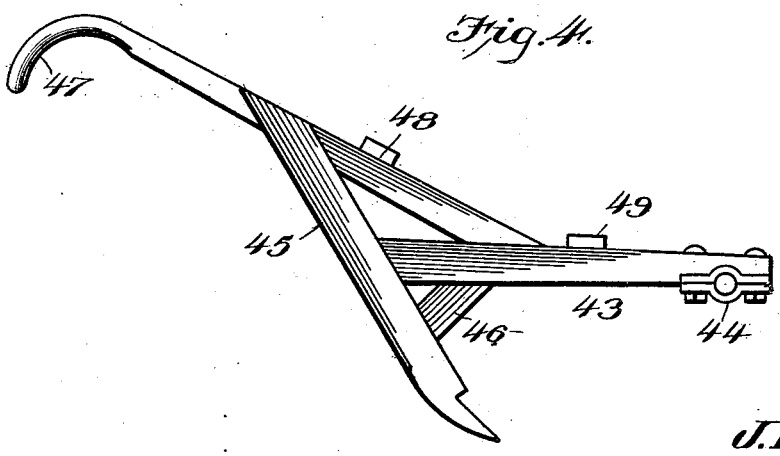
Figure 2:
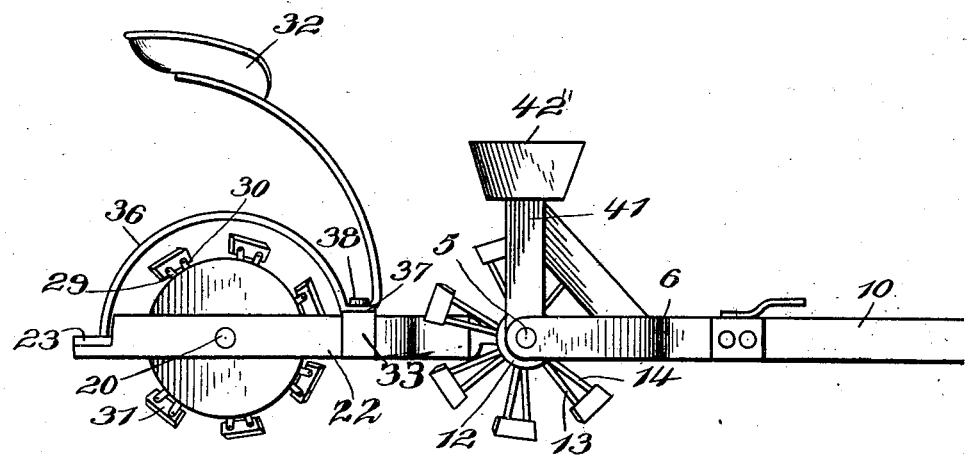
Figure 3:
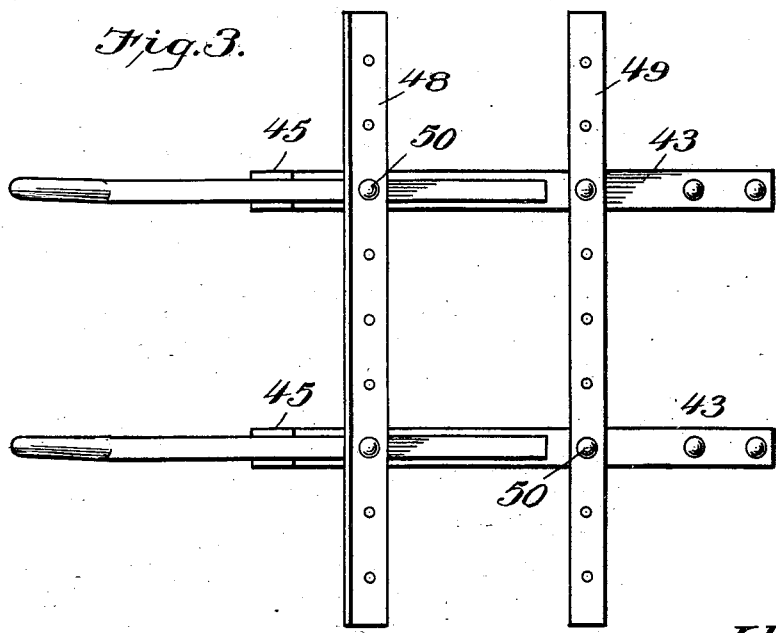

In the drawings forming a portion of this specification, and in which like numerals of reference indicate similar parts in the several views, Figure 1 is a top plan view of the chopper. Fig. 2 is a side elevation of the chopper. Fig. 3 is a top plan view of the cultivator attachment. Fig. 4 is an elevation showing the cultivator attachment.

Referring now to the drawings, the present chopper comprises two main members—a front member and a rear member, the former having two chopping-wheels and the latter one chopping-wheel.

The front member of the implement consists of an axle 5, at the ends of which are connected the outer hounds 6, between the ends of which in front of the central portion of the axle are disposed the free ends of other hounds 7, the rear ends of which are offset in opposite directions, as shown at 8, and are secured to the axle by means of the clips 9, the attached ends of the hounds 7 being thus laterally spaced and lying at opposite sides of the central portion of the axle for a purpose to be presently explained. Between the free ends of the inner hounds 7 is disposed a tongue 10, held in position by bolts passed through the free ends of both the inner and outer hounds and through the tongue.

Upon the axle 5 between the members of the outer hounds and at each side of the inner hounds is disposed a chopping-wheel, said wheels and their arrangements being the same, so that a description of one will suffice for both. The chopping-wheel consists of two spaced disks 11 and 12, which disks are, in effect, hubs and which hubs are provided with radiating spokes 13 and 14, respectively, the spokes of both hubs being of the same length and being spaced like angular distances. The spokes of the outer disk or the disk near to the outer end of the axle are advanced a slight angular distance beyond those of the inner disk, and connecting the spokes are the compound curved cutting-blades, which lie in planes radiating from the hubs and intersecting the common axis of the hubs, as shown. To prevent lateral displacement of the chopping-wheels upon the axle, plates 15 and 16 are disposed upon the axle at opposite sides of the wheels and against the outer faces of the hubs and are held fixedly upon the axle by means of the set-screws 17 and 18, and by adjustment of these plates the two wheels may be adjusted toward or away from each other, as may be desired. The rear member of the chopper includes also an axle, (shown at 20,) and the ends of which are mounted in the rails 21 and 22, connected at their rear ends by the cross-brace 23, the opposite ends of the rails being bent inwardly and then forwardly to form hounds, and between them is fixed the clevis 24, connected by a vertical pivot 25 with a second clevis 26 or clip, clamped upon the axle 5 at its middle point between the members of the inner hounds 7.

Between the rails 21 and 22 and upon the axle 20 are disposed the hubs 27 and 28 of the rear cutter or chopping wheel having radiating spokes 29 and 30, connected by the knifes 31, the three chopping-wheels being alike.

Upon the hounds of the rear chopping member is mounted a seat 32 through the medium of the cross-piece 33, the ends of which are bent downwardly against the outer faces of the hounds and are riveted thereto.

The cross-piece or brace 23 has openings 34 therein, in which are engaged the fingers 35 at the rear end of an arc-shaped shield 36, which is thus hinged to the frame of the rear chopper for movement into and out of position over the chopping-wheel, and at the front edge of the shield are the forwardly-directed ears 37, which lie upon the crosspiece 33, in which position they are held by the turn-buttons 38, secured to said crosspiece, the shield lying beneath the seat and its supporting-spring.

Upon the rear portion of the tongue is disposed the doubletree 39, to the ends of which are connected the singletrees 40.

Upon the axle 5 and over each of the chopping-wheels thereon is disposed a U-shaped frame 41, which carries a box 42, these frames being braced at their ends to the outer hounds.

When the implement is to be used for plowing or marking, the frame of the rear chopping-wheel is disconnected from the front axle, and the chopping-wheels are removed from the front axle 5, after which plows have their beams 43 connected to the axle 5 by means of the clamping-plate 44, passed around the axle and which permit of the plows being adjusted toward and away from each other. Each plow consists of a beam 43, to the rear end of which is fastened a standard 45, which extends both above and below the beam and is connected with the beam by the lower brace 46 below the beam. A handle 47 is connected to the upper face of the beam and passing rearwardly is engaged with the upper end of the standard and continued therebeyond. To hold the plows spaced to different extents, cross-ties 48 and 49 are employed and have corresponding perforations therein, these perforations being adapted to receive pins 50, which are engaged therethrough and through perforations in the beams and handles of the plows, respectively.

In practice the plows are adjusted to the proper spacing, and any number of plows may be employed, the plows being held by the spacing-beams or cross-ties referred to.

It will be understood that any suitable materials and proportions may be used for the various parts and that modifications may be made without departing from the spirit of the invention.

What is claimed is—

1. A chopping implement comprising an axle having chopping-wheels mounted thereon adjacent to its ends, outer hounds connected to the ends of the axle, inner hounds connected to the axle between the wheels, and a third chopping-wheel having hounds pivotally connected with the axle between the inner hounds for lateral movement.

2. A chopping implement comprising a forward member including an axle having chopping-wheels mounted at the ends thereof and outer and inner hounds connected respectively to the ends and the middle portion of the axle, a tongue connected to the hounds, a rear member comprising a chopping-wheel having hounds provided with a clevis, and a clip attached to the axle of the forward member and with which the clevis is pivotally connected for movement laterally.

3. A chopping implement comprising an axle having chopping-wheels mounted removably thereon, inner hounds connected to the axle between the wheels, outer hounds with which the ends of the axle are removably connected to permit of removal of the wheels from the axle, and a third chopping-wheel having hounds removably connected with the axle between the inner hounds, said inner and outer hounds having a tongue connected thereto.

In testimony whereof I affix my signature in presence of two witnesses.

JOAB H. COTTEN.

Witnesses:
J. W. BEATTIE,
M. E. BLACKSTONE.